US006890974B2

(12) United States Patent
Park et al.

(10) Patent No.: US 6,890,974 B2
(45) Date of Patent: May 10, 2005

(54) POWDER COATING COMPOSITION CONTAINING LOW TEMPERATURE CURABLE EPOXY RESIN

(75) Inventors: Chongsoo Park, Kwangmyung (KR); Youngsoo Park, Seoul (KR); Jinwoo Kim, Kwangmyung (KR)

(73) Assignee: Kukdo Chemical Co., Ltd., Seoul (KR)

( * ) Notice: Subject to any disclaimer, the term of this patent is extended or adjusted under 35 U.S.C. 154(b) by 103 days.

(21) Appl. No.: 10/321,514

(22) Filed: Dec. 18, 2002

(65) Prior Publication Data

US 2003/0130441 A1 Jul. 10, 2003

Related U.S. Application Data

(63) Continuation-in-part of application No. 10/138,406, filed on May 6, 2002, now Pat. No. 6,593,401.

(30) Foreign Application Priority Data

Dec. 19, 2001 (KR) .......................................... 2001-81150
Oct. 22, 2002 (KR) .......................................... 2002-64617

(51) Int. Cl.⁷ ............................ C08K 3/10; C08L 63/02

(52) U.S. Cl. ........................ 523/458; 525/438; 525/449; 525/471; 525/523

(58) Field of Search .......................... 523/458; 525/438, 525/449, 471, 523

(56) References Cited

U.S. PATENT DOCUMENTS 6,593,401 B1 * 7/2003 Park et al. .................. 523/458

* cited by examiner

*Primary Examiner*—Philip Tucker
*Assistant Examiner*—D. Aylward
(74) *Attorney, Agent, or Firm*—Bacon & Thomas

(57) ABSTRACT

The present invention relates to a powder coating composition containing a low temperature curable epoxy resin, and more particularly to a powder coating composition containing a low temperature curable epoxy resin, which can be readily cured at a low temperature, thereby capable of being applied to coating objects that are noneconomic al in terms of workability at an elevated temperature, or are thermally sensitive. The present invention provides a powder coating composition comprising 100 parts by weight of a low temperature curable epoxy resin; 30 to 500 parts by weight of curing.

7 Claims, No Drawings

POWDER COATING COMPOSITION CONTAINING LOW TEMPERATURE CURABLE EPOXY RESIN

This application is being filed as a continuation-in-part of Ser. No. 10/138,406, which was filed May 6, 2002 now U.S. Pat. No. 6,593,401.

BACKGROUND OF THE INVENTION

1. Field of the Invention

The present invention relates to a powder coating composition containing a low temperature curable epoxy resin, and more particularly to a powder coating composition containing a low temperature curable epoxy resin, which can be readily cured at a low temperature, thereby capable of being applied to coating objects that are difficult in elevating temperature, or are thermally sensitive.

2. Description of the Related Art

Epoxy resin is a molecule having two or more epoxy functional groups. Epoxy resin is a kind of thermosetting resin irreversibly crosslinked to form a three-dimensional structure at room temperature or under the influence of heat. However, epoxy resins are different from other thermosetting resins in that curing is not carried out on heating in the absence of a catalyst or a curing agent. An epoxy resin is widely used in molded products, cast products, coatings and the like due to its excellent adhesion, mechanical property, electrical property, chemical resistance, etc.

In particular, the epoxy resin is excellent in adhesion, water resistance, and chemical resistance to various types of coating objects, including metals. Accordingly, the epoxy resin based coatings are widely used instead of alkyd resin or phenolic resin based coatings.

A powder coating composition is a coating film forming composition in the form of powder and does not use a volatile solvent such as an organic solvent or water. The powder coating composition is applied to a coating object and then heat-melted. The powder coating composition has advantages in that it does not use a solvent, can form a thick coating film with just one coating, and can use a high molecular weight resin which is not dissolved in a solvent, compared with a solvent-type coating composition. Accordingly, use and demand for the powder coating composition are increasing in fields of construction materials, automobile parts, pipes, mechanical parts, electronic products, iron furniture and the like.

The powder coating composition is generally produced as follows: a resin for a powder coating composition, a curing agent, a pigment and an additive, and the like are mixed in a blender. The mixture is placed into an extruder or a roll-mill, where it is heated at a temperature in a range of 80 to 130° C., melt-mixed and ground into a powder. Thereafter, a coating object is coated with the ground powder coating composition. Alternatively, the powder coating composition can be produced by mixing the above components in a mixer such as a ball-mill or a ribbon blender at room temperature.

The powder coating composition can be coated by various coating techniques, for example, a spray coating technique, a flow coating technique or an electrostatic coating technique. The electrostatic coating technique is most widely used.

Examples of the resin for the powder coating composition are an epoxy resin and a polyester resin. The epoxy resin is generally a bisphenol-A epoxy resin manufactured by reacting bisphenol-A and epichlorohydrin in the presence of a base or an acid. The bisphenol-A epoxy resin is excellent in chemical resistance and corrosion resistance. However, because it is cured at a high temperature, for thick metallic coating objects that cannot reach an elevated temperature within a short time, a large amount of heat energy must be applied thereto, and thus energy use increases. Further, it is difficult to apply to coating objects that are thermally sensitive.

On the other hand, in glycidyl ethers of conventional bisphenol compounds, there have been a number of suggestions that multifunctional bisphenol epoxy resins obtained by further reacting secondary hydroxyl groups of the glycidyl ethers with epichlorohydrin can be used as sealing materials, laminates of electrical and electronic components, etc (see, U.S. Pat. No. 4,623,701, Japanese Patent Laid-open Nos. Hei 5-5020, 6-248055, 6-298904, etc.). However, these references fail to disclose the manufacture of powder coating using the epoxy resins.

SUMMARY OF THE INVENTION

Therefore, the present invention has been made in view of the above problems, and it is an object of the present invention to provide a powder coating composition containing a low temperature curable epoxy resin with corrosion resistance.

DESCRIPTION OF THE PREFERRED EMBODIMENTS

In accordance with the present invention, the above and other objects can be accomplished by the provision of a powder coating composition comprising 100 parts by weight of a low temperature curable epoxy resin represented by formula 1 below:

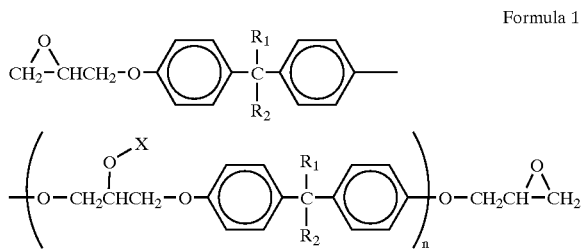

Formula 1 wherein n is a real number of from 0.1 to 30; $R_1$ and $R_2$ are, independently, a hydrogen atom, or an unsubstituted or substituted alkyl or alkoxy group having from 1 to 5 carbon atoms; and X is a hydrogen atom or glycidyl group, wherein more than 20% of X are glycidyl groups; and 30 to 500 parts by weight of a curing agent.

It is preferred that $R_1$ and $R_2$ each are individually a hydrogen or a methyl group, and n is an integer of 1 to 15.

In accordance with one embodiment of the present invention, the curing agent is preferably a bisphenol-A curing agent or a polyester curing agent.

In accordance with another embodiment of the present invention, the powder coating composition preferably further comprises 10 to 200 parts by weight of a universal bisphenol-A epoxy resin for powder coating compositions (epoxy equivalent weight: 600 to 1500 g/eq) per 100 parts by weight of the low temperature curable epoxy resin of the formula 1.

In accordance with yet another embodiment of the present invention, the powder coating composition preferably further comprises one or more components selected from the group consisting of a pigment, an antioxidant, a filler, a light stabilizer, and a curing promoter.

Examples of the alkyl group having from 1 to 5 carbon atoms, represented as "R" in formula 1, include methyl, ethyl, propyl, butyl groups, etc. n is a number of from 0.1 to 30, and preferably from 1 to 15. X is a hydrogen atom or a glycidyl group. More than 20% of X are glycidyl groups, and preferably more than 25% are glycidyl groups.

Herein, n and X refer to average values. When n is less than 0.1, or less than 20% of X are glycidyl groups in the epoxy resin, the content of multifunctional epoxy compounds not less than trifunction is low and thus the epoxy resin is unsatisfactory in its curability and properties of the coated object.

Hereinafter, the present invention will be described in more detail.

A conventional epoxy resin is excellent in corrosion resistance but is generally cured at a high temperature. To improve this aspect, the low temperature curable epoxy resin of the formula 1 with multifunctional groups was used in the powder coating composition of the present invention. As a result, the epoxy resin of the present invention not only maintains corrosion resistance, but can also be cured at a low temperature.

The powder coating composition of the present invention comprises the multifunctional and low temperature curable epoxy resin of the formula 1 as its subject, and a bisphenol-A resin or a polyester resin as a curing agent. The reason why the bishphenol-A resin or the polyester resin is used instead of a conventional coating curing agent such as an acid anhydride or amine, is to cure the powder coating composition at a low temperature.

The amount of the bisphenol-A curing agent or the polyester curing agent to be used in the powder coating composition of the present invention is 30 to 500 parts by weight per 100 parts by weight of the multifunctional epoxy resin of the formula 1. This is to ensure the functional groups of the multifunctional epoxy resin completely react one-to-one with those of the curing agent, so as not to leave any epoxy resin functional groups unreacted.

The epoxy resin of formula 1 contained in the powder coating composition according to the present invention preferably has an epoxy equivalent weight of 200–600 g/eq. When the epoxy equivalent weight exceeds 600 g/eq, there are risks of coloring of cured material and poor physical properties.

A polyester curing agent to be used in the powder coating composition of the present invention is that conventionally used in powder coating compositions in the pertinent art. The polyester curing agent is not particularly limited provided that it has carboxyl groups capable of participating in the curing reaction with the epoxy resin of the present invention. The polyester curing agent has preferably a glass transition temperature of 55 to 65° C. and an acid value of 30 to 80.

Examples of the polyester curing agent commercially available are trademark KP-3520 (KUKDO CHEMICAL Co., LTD, Korea), trademark KP-3531 (KUKDO CHEMICAL Co., LTD, Korea), trademark KP-3620 (KUKDO CHEMICAL Co., LTD, Korea), trademark KP-3720 (KUKDO CHEMICAL Co., LTD, Korea), and the like.

A bisphenol-A curing agent to be used in the powder coating composition of the present invention is that conventionally used in powder coating compositions in the pertinent art. The bisphenol-A curing agent has OH terminal groups and the equivalent weight of the OH groups is preferably 200 to 800.

Examples of the bisphenol-A curing agent commercially available are trademark KD-410J (KUKDO CHEMICAL Co., LTD, Korea), trademark KD-406 (KUKDO CHEMICAL Co., LTD, Korea), trademark KD-420 (KUKDO CHEMICAL Co., LTD, Korea), trademark KD-426 (KUKDO CHEMICAL Co., LTD, Korea), and the like.

The powder coating composition further comprises a universal bisphenol-A epoxy resin for powder coating compositions with an epoxy equivalent weight of 600 to 1500 g/eq. The universal bisphenol-A epoxy resin reacts with the bisphenol-A curing agent or the polyester curing agent upon the curing of the powder coating composition of the present invention. The universal bisphenol-A epoxy resin for powder coating compositions with an epoxy equivalent weight of 600 to 1500 g/eq is preferably added in an amount of 10 to 200 parts by weight per 100 parts by weight of the low temperature epoxy resin of the formula 1. If the added amount is less than 10 parts by weight, little effect is obtained, while if it exceeds 200 parts by weight, low temperature curability is lost and mechanical properties deteriorate.

The powder coating composition of the present invention preferably comprises a desired amount of a defoaming agent known in the pertinent art. The defoaming agent serves to control foams formed in the surface of a coating film. The content thereof is preferably 0.1 to 20 parts by weight based on the total weight of the composition. If the content is outside the above range, physical properties are adversely affected.

The leveling agent used in the powder coating composition imparts smoothness to a coating film. Its content is preferably 0.1 to 20 parts by weight. If the content is outside the above range, physical properties are adversely affected.

The powder coating composition can further comprise known additives conventionally added to powder coating compositions in the pertinent art. Examples of the additives are a pigment, an antioxidant, a filler, a light stabilizer, a curing promoter or an ultraviolet absorber, or the like.

The multifunctional low temperature curable epoxy resin of the formula 1 used in the present invention can be prepared by polymerizing a bisphenol-A epoxy resin of formula 2 below, and an epichlorohydrin.

Formula 2

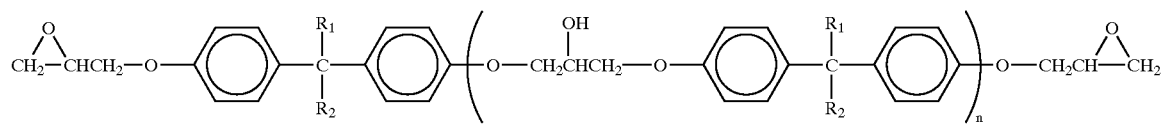

invention. The polyester curing agent has preferably a glass transition temperature of 55 to 65° C. and an acid value of 30 to 80.

wherein $R_1$ and $R_2$ are individually a hydrogen, a substituted or unsubstituted $C_1$–$C_5$ alkyl or alkoxy group, and n is an integer of 1 to 30.

The epichlorohydrin used to prepare the low temperature curable epoxy resin of the present invention is also referred to as 1,2-epoxy-3-chloropropane. It has the chemical structure of formula 3 below and is a colorless liquid. A DL-epichlorohydrin and a L-epichlorohydrin are known. The DL-epichlorohydrin is common.

Formula 3

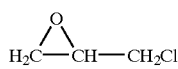

The multifunctional epoxy resin of the formula 1 of the present invention can be prepared by reacting the bisphenol-A epoxy resin of the formula 2 and the epichlorohydrin of the formula 3. The preparation method thereof is as illustrated in equation 1 below.

Equation 1

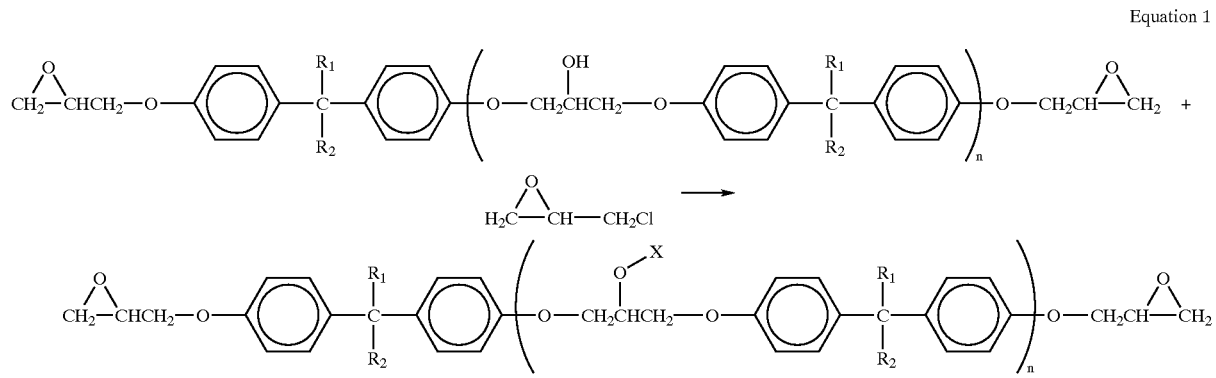

As shown in the equation 1, the multifunctional epoxy resin of the formula 1 can be obtained by reacting the bisphenol-A epoxy resin of the formula 2 and an excess of the epichlorohydrin of the formula 3 in the presence of a catalyst.

The reaction is carried out in a range of 50 to 180° C. and under reduced pressure of 30 to 250 Torr.

The reaction time is 2 to 30 hours.

As catalysts that can be used in the reaction, alkali compounds, Lewis acids and phase-transfer catalysts may be exemplified. Examples of the alkali compounds include sodium hydroxide, potassium hydroxide, calcium hydroxide, etc. Examples of the Lewis acids include boron trifluoride, tin chloride, zinc chloride, etc.

Examples of the phase-transfer catalysts include tetramethylammonium chloride, tetrabutylammonium bromide, methyltrioctylammonium chloride, methyltridecylammonium chloride, N,N-dimethylpyrrolidium chloride, N-ethyl-N-methylpyrrolidium iodide, N-butyl-N-methylpyrrolidium bromide, N-benzyl-N-methylpyrrolidium chloride, N-ethyl-N-methylpyrrolidium bromide, N-butyl-N-methylmorphonium bromide, N-butyl-N-methylmorphonium iodide, N-allyl-N-methylmorphonium bromide, N-methyl-N-benzylpiperidium chloride, N-methyl-N-benzylpiperidium bromide, N,N-dimethylpiperidium iodide, N-methyl-N-ethylpiperidium acetate, N-methyl-N-ethylpiperidium iodide, etc., and tetramethylammonium chloride is more preferable.

The amount of epichlorohydrin used in the reaction is not less than 1 equivalent weight, and preferably within the range of 2~10 equivalent weight, relative to 1 equivalent weight of hydroxyl group of diglycidyl ether. The amount of the alkali compounds used in the reaction is within the range of 0.1~2.0 moles, and preferably 0.3~1.5 moles, relative to 1 equivalent weight of glycidylated hydroxyl group. The amount of the phase-transfer catalysts used is within the range of 0.01~10 mol %, and preferably 0.2~2 mol %, based on the total weight of the reactants.

The reaction can be carried out in a solvent such as a hydrocarbon, ether or ketone, and an excess of epichlorohydrin can be used as a solvent.

In epoxy resin of formula 1 in which 20~100% of X is glycidyl group, the content of the glycidyl group can be appropriately adjusted depending on various factors such as the amount of epichlorohydrin used, reaction temperature, reaction pressure, reaction time, and types and amount of catalysts used.

The multifunctional epoxy resin of the formula 1 obtained in above reaction has an epoxy equivalent weight of 200 to 600 and an n value of 1 to 30.

The epichlorohydrin of the formula 3 is preferably added in an excess amount relative to the bisphenol-A epoxy resin of the formula 2. The molar ratio of the bisphenol-A epoxy to the epichlorohydrin is 1:30 to 1:80.

The bisphenol-A epoxy resin of the formula 2 has preferably an epoxy equivalent weight of 400 to 2000, and more preferably an epoxy equivalent weight of 400 to 100.

The bisphenol-A epoxy resin of the formula 2 can be selected among products commercially available, without being particularly limited. The bisphenol-A epoxy resin of the formula 2 can also be prepared according to equation 2 below.

Equation 2

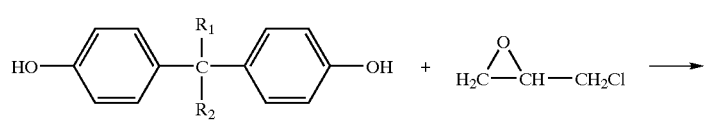

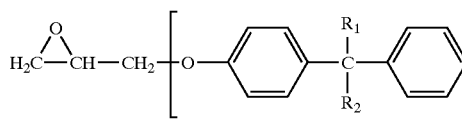 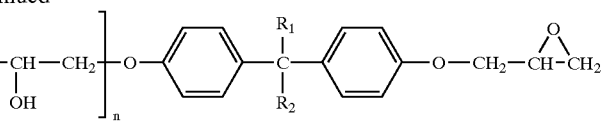

wherein $R_1$, $R_2$ and n are as defined in the formula 1.
wherein $R_1$, $R_2$ and n are as defined in the formula 1.

As shown in the equation 2, the conventional bisphenol-A of the formula 4 and the epichlorohydrin of the formula 3 can react to form the bisphenol-A epoxy resin of the formula 2.

EXAMPLES

The invention will be described with reference to, but is not limited to, the following examples.

Reference Example 1
Preparation of Multifunctional Epoxy Resin 65 parts by weight of bisphenol-A epoxy resin (epoxy equivalent weight 650, n=3.4), 46.3 parts by weight of epichlorohydrin and 0.2 parts by weight of tetramethylammonium chloride were charged into a flask equipped with a reflux apparatus, a stirring apparatus, a vacuum apparatus and a dropping apparatus. 48% (w/w) aqueous solution of 8.5 parts by weight of sodium hydroxide was added to the dropping apparatus. While the aqueous sodium hydroxide solution was added dropwise to the flask under reflux at 50~60° C. and 80 torr over 2 hours, water was removed by azeotropic distillation. After the mixture was further reacted for 2 hours, it was cooled and filtered. Solvents were removed by an evaporator to prepare a desired multifunctional epoxy resin (epoxy equivalent weight 340, G [the ratio of glycidyl group in X of formula 1]=65% (EP-1).

Reference Example 2
Preparation of Multifunctional Epoxy Resin 47.5 parts by weight of bisphenol-A epoxy resin (epoxy equivalent weight 475, n=2.1), 46.3 parts by weight of epichlorohydrin and 0.2 parts by weight of tetramethylammonium chloride were charged into a flask equipped with a reflux apparatus, a stirring apparatus, a vacuum apparatus and a dropping apparatus. 48% (w/w) aqueous solution of 5.5 parts by weight of sodium hydroxide was added to the dropping apparatus. While the aqueous sodium hydroxide solution was added dropwise to the flask under reflux at 50~60° C. and 80 torr over 2 hours, water was removed by azeotropic distillation. After the mixture was further reacted for 2 hours, it was cooled and filtered. Solvents were removed by an evaporator to prepare a desired multifunctional epoxy resin (epoxy equivalent weight 310, G=62%) (EP-2).

Reference Example 3
Preparation of Multifunctional Epoxy Resin 200 parts by weight of bisphenol-A epoxy resin (epoxy equivalent weight 1000, n=5.8), 46.3 parts by weight of epichlorohydrin and 0.2 parts by weight of tetramethylammonium chloride were charged into a flask equipped with a reflux apparatus, a stirring apparatus, a vacuum apparatus and a dropping apparatus. 48% (w/w) aqueous solution of 15 parts by weight of sodium hydroxide was added to the dropping apparatus. While the aqueous sodium hydroxide solution was added dropwise to the flask under reflux at 50~60° C. and 80 torr over 2 hours, water was removed by azeotropic distillation. After the mixture was further reacted for 2 hours, it was cooled and filtered. Solvents were removed by an evaporator to prepare a desired multifunctional epoxy resin (epoxy equivalent weight 420, G=55%) (EP-3).

Reference Example 4
Preparation of Multifunctional Epoxy Resin 47.5 parts by weight of bisphenol-A epoxy resin, 92.5 parts by weight of epichlorohydrin and 0.4 parts by weight of tetramethylammonium chloride were charged into a flask equipped with a reflux apparatus, a stirring apparatus, a vacuum apparatus and a dropping apparatus. 48% (w/w) aqueous solution of 4.9 parts by weight of sodium hydroxide was added to the dropping apparatus. While the aqueous sodium hydroxide solution was added dropwise to the flask under reflux at 50~60° C. and 80 torr over 2 hours, water was removed by azeotropic distillation. After the mixture was further reacted for 2 hours, it was cooled and filtered. Solvents were removed by an evaporator to prepare a desired multifunctional epoxy resin (epoxy equivalent weight 278, G=82%) (EP-4).

Reference Example 5
Preparation of Multifunctional Epoxy Resin 65 parts by weight of bisphenol-A epoxy resin, 162 parts by weight of epichlorohydrin and 81.0 parts by weight of dimethyl sulfoxide were charged into a flask equipped with a reflux apparatus, a stirring apparatus, a vacuum apparatus and a dropping apparatus, and then 9.1 parts by weight of sodium. hydroxide was slowly added thereto at 70° C. with stirring. After the addition, the reaction mixture was further reacted for 3 hours. Unreacted epichlorohydrin and dimethyl sulfoxide were removed under reduced pressure. The reaction product containing byproduct salts and dimethyl sulfoxide was dissolved in 150 parts by weight of methylisobutyl ketone, and then 2 parts by weight of 30% aqueous sodium hydroxide solution was added thereto. After the mixture was further reacted at 70° C. for 2 hours, it was cooled and oil/water-separated. Solvents were removed by an evaporator to prepare a desired multifunctional epoxy resin (epoxy equivalent weight: 295, G=90%) (EP-5).

Reference Example 6
Preparation of Multifunctional Epoxy Resin 100 parts by weight of bisphenol-F epoxy resin (epoxy equivalent weight 1000, n=6.6), 46.3 parts by weight of epichlorohydrin and 0.4 parts by weight of tetramethylammonium chloride were charged into a flask equipped with a reflux apparatus, a stirring apparatus, a vacuum apparatus and a dropping apparatus. 48% (w/w) aqueous solution of 4.9 parts by weight of sodium hydroxide was added to the dropping apparatus. While the aqueous sodium hydroxide solution was added dropwise to the flask under reflux at 50~60° C. and 80 torr over 2 hours, water was removed by azeotropic distillation. After the mixture was further reacted for 2 hours, it was cooled and filtered. Solvents were removed by an evaporator to prepare a desired multifunctional epoxy resin (epoxy equivalent weight 320, G=65%) (EP-6).

Reference Example 7
Preparation of Multifunctional Epoxy Resin 50 parts by weight of bisphenol-A epoxy resin (epoxy equivalent weight 700, n=3.7), 130 parts by weight of epichlorohydrin and 0.4 parts by weight of tetramethylammonium chloride were charged into a flask equipped with a reflux apparatus, a stirring apparatus, a vacuum apparatus and a dropping apparatus. 48% (w/w) aqueous solution of 8.5 parts by weight of sodium hydroxide was added to the dropping apparatus. While the aqueous sodium hydroxide solution was added dropwise to the flask under reflux at 50~60° C. and 80 torr over 2 hours, water was removed by azeotropic distillation. After the mixture was further reacted for 2 hours, it was cooled and filtered. Solvents were removed by an evaporator to prepare a desired multifunctional epoxy resin (epoxy equivalent weight 304.5, G=85%) (EP-7).

Examples 1 to 12
Preparation of Powder Coating Composition

After each multifunctional epoxy resin prepared in Reference Examples 1 to 7 and components shown in Table 1 were mixed, each mixture was passed through the extruder ZSK25 (W&P, Main screw rpm: 250). The extruded mixtures were ground and applied onto the surface of metal using a GEMA electrostatic spray gun (60–80KV) The metal was cured at 140° C.

Comparative Example
preparation of Powder Coating Composition

A powder coating composition having the composition shown in Table 1 below was prepared in the same manner as described in the example 1.

TABLE 1

| Components | 1 | 2 | 3 | 4 | 5 | 6 | 7 | 8 | 9 | 10 | 11 | 12 | Comp. Example |
|---|---|---|---|---|---|---|---|---|---|---|---|---|---|
| Multifunctional epoxy resin (EP-1) | 90 | 69 | | | | | | | | | | | |
| Multifunctional epoxy resin (EP-2) | | | 65 | | | | | | | | | | |
| Multifunctional epoxy resin (EP-3) | | | | 78 | | | | | | | | | |
| Multifunctional epoxy resin (EP-4) | | | | | 77 | 59 | | | | | | | |
| Multifunctional epoxy resin (EP-5) | | | | | | | 81 | 57 | | | | | |
| Multifunctional epoxy resin (EP-6) | | | | | | | | | 83 | | | | |
| Multifunctional epoxy resin (EP-7) | | | | | | | | | | | | | |
| Bisphenol-A epoxy resin | | 29 | 28 | 33 | | 32 | | 38 | 35 | 95 | 64 | 49 | |
| KD-242G | | | | | | | | | | | 43 | 67 | 140 |
| | 210 | 202 | 207 | 188 | 223 | 210 | 219 | 206 | 182 | 205 | 193 | 184 | 160 |
| Benzoin | 5 | 5 | 5 | 5 | 5 | 5 | 5 | 5 | 5 | 5 | 5 | 5 | 5 |
| | 5 | 5 | 5 | 5 | 5 | 5 | 5 | 5 | 5 | 5 | 5 | 5 | 5 |
| | 50 | 50 | 50 | 50 | 50 | 50 | 50 | 50 | 50 | 50 | 50 | 50 | 50 |
| | 150 | 150 | 150 | 150 | 150 | 150 | 150 | 150 | 150 | 150 | 150 | 150 | 150 |
| methylimidazole | 0.5 | 0.5 | 0.5 | 0.5 | 0.5 | 0.5 | 0.5 | 0.5 | 0.5 | 0.5 | 0.5 | 0.5 | 0.5 |

All numeral values in Table 1 are expressed as part by weight.

In the composition of the Table 1, the trademark KD-242G (made by KUKDO CHEMICAL Co., LTD) is a universal bisphenol-A epoxy resin for powder coating compositions with an epoxy equivalent weight of 650–725 g/eq, and the trademark KP-3520 (made by KUKDO CHEMICAL Co., LTD) is a polyester resin for a powder coating composition as a curing agent.

The benzoin and the trademark PV5 (made by Wolee) were used as a defoaming agent and a leveling agent, respectively. The $BaSO_4$ as a filler, the $TiO_2$ as a pigment, and the 2-methyl imidazole as a curing promoter were used.

Experiment: Impact Test, Erichsen Test and Gellation Time Measurement

Impact test, Erichsen test and gellation time measurement were conducted for the examples 1–12 and comparative example. The results are shown in Table 2 below. The methods for the tests are as follows.

The Impact test was conducted according to ASTM D2794.

The Erichsen test was conducted according to ISO1520.

TABLE 2

Results of impact test and Erichsen test

| Tests | | Example 1 | 2 | 3 | 4 | 5 | 6 | 7 | 8 | 9 | 10 | 11 | 12 | Comp. Example |
|---|---|---|---|---|---|---|---|---|---|---|---|---|---|---|
| Impact strength (Direct, 1■50) | 130° C. × 20 min. | ○ | ○ | ○ | ○ | ○ | ○ | ○ | ○ | ○ | Δ | ○ | ○ | X |
| | 140° C. × 15 min. | ○ | ○ | ○ | ○ | ○ | ○ | ○ | ○ | ○ | ○ | ○ | ○ | X |
| | 150° C. × 10 min. | ○ | ○ | ○ | ○ | ○ | ○ | ○ | ○ | ○ | ○ | ○ | ○ | X |
| Erichsen (8) | 130° C. × 20 min. | ○ | ○ | ○ | ○ | ○ | ○ | ○ | ○ | ○ | ○ | ○ | ○ | X |
| | 140° C. × 15 min. | ○ | ○ | ○ | ○ | ○ | ○ | ○ | ○ | ○ | ○ | ○ | ○ | X |
| | 150° C. × 10 min. | ○ | ○ | ○ | ○ | ○ | ○ | ○ | ○ | ○ | ○ | ○ | ○ | X |
| Gellation Time Sec. | 130° C. | 170 | 225 | 235 | 250 | 160 | 185 | 150 | 180 | 220 | 147 | 168 | 230 | 421 |
| | 140° C. | 104 | 130 | 140 | 150 | 100 | 105 | 98 | 105 | 123 | 95 | 104 | 138 | 275 |
| | 150° C. | 65 | 80 | 83 | 85 | 62 | 67 | 60 | 67 | 78 | 57 | 65 | 82 | 183 |

○: good,
Δ: slight crack,
X: crack

As can be seen from the Table 2, the results of the impact test and Erichsen test show that the examples 1–12, which comprise the multifunctional epoxy resin of the present invention, are excellent in mechanical properties, compared with the comparative example, under the same curing condition.

As apparent from the above description, the powder coating composition comprising the multifunctional and low temperature curable epoxy resin of the present invention has excellent curability at a low temperature, thereby capable of being applied to thick metallic coating objects that cannot reach an elevated temperature within a short time, or coating objects that are thermally sensitive. Accordingly, the present invention is advantageous in terms of energy savings and environmental protection, because sufficient curing can be accomplished with a small amount of energy.

What is claimed is:

1. A powder coating composition, comprising:
   100 parts by weight of a low temperature curable epoxy resin, represented by formula 1 below:

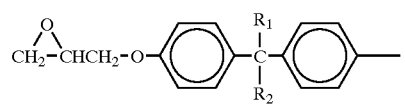

Formula 1

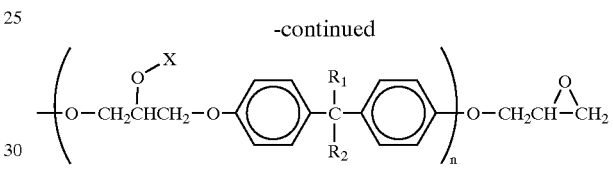

-continued wherein n is a real number of from 0.1 to 30; $R_1$ and $R_2$ are, independently, a hydrogen, or an unsubstituted or substituted alkyl or alkoxy group having from 1 to 5 carbon atoms; and X is a hydrogen atom or a glycidyl group, wherein more than 20% of X are glycidyl groups; and 30 to 500 parts by weight of a curing agent.

2. The powder coating composition as set forth in claim 1, wherein the epoxy resin is represented by formula 4 below:

Formula 4

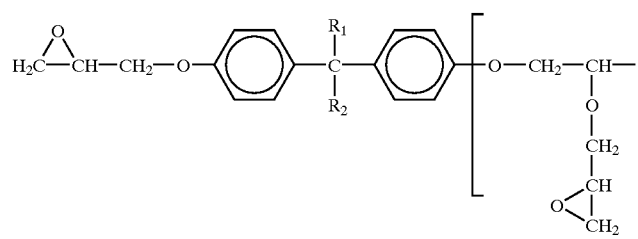

wherein $R_1$, $R_2$ and n are as described in claim 1.

3. The powder coating composition as set forth in claim 1, wherein $R_1$ and $R_2$ are all methyl, and n is a real number of 1~15.

4. The powder coating composition as set forth in claim 1, which comprises 0.1 to 20 parts by weight of a defoaming agent and 0.1 to 20 parts by weight of a leveling agent.

5. The powder coating composition as set forth in claim 1, wherein the curing agent is a phenolic curing agent or a polyester-based curing agent.

6. The powder coating composition as set forth in claim 1, which comprises 10 to 200 parts by weight of a universal bisphenol-A epoxy resin for powder coatings having an epoxy equivalent weight of 600 to 1500 g/eq, based on 100 parts by weight of the low temperature curable epoxy resin represented by formula 1.

7. The powder coating composition as set forth in claim 1, which further comprises at least one additive selected from the group consisting of a pigment, an antioxidant, a filler, a light stabilizer, a curing promoter and an ultraviolet absorber.

* * * * *